United States Patent [19]
Ooka

[11] 3,802,213
[45] Apr. 9, 1974

[54] GAS TRANSMISSION SYSTEM SUITABLE OVER WIDE DEMAND VARIATION

[75] Inventor: Isami Ooka, Neyagawa, Japan

[73] Assignee: Osaka Gas Kabushiki Kaisha, Osaka, Japan

[22] Filed: Oct. 25, 1972

[21] Appl. No.: 300,813

[30] Foreign Application Priority Data
Oct. 26, 1971  Japan.............................. 46-99196

[52] U.S. Cl. .................................................. 62/55
[51] Int. Cl. ............................................. F17c 7/02
[58] Field of Search........................... 62/52, 53, 55

[56] References Cited
UNITED STATES PATENTS
2,958,205   11/1960   McKonkey......................... 62/55 X
3,365,898   1/1968    Van Kleef............................. 62/55

Primary Examiner—Meyer Perlin
Assistant Examiner—Ronald C. Capossela
Attorney, Agent, or Firm—Edwin E. Greigg

[57] ABSTRACT

A gas transmission system consisting of a cooling apparatus for liquefying gas taken out from a pipe line, a tank for storing the liquefied gas maintaining it in liquid, an apparatus for evaporating the liquefied gas to supply to the pipe line, a tank for storing heat transmission fluid in cooled condition, said heat transmission fluid cooled by the evaporation of the liquefied gas, and an apparatus for utilizing the cooled heat transmission fluid as the energy source for liquefaction of gas. Liquefaction and storage of gas and also evaporation and supply thereof are performed selectively according to the variation of demand for gas in the pipe line.

7 Claims, 2 Drawing Figures

A GAS TRANSMISSION SYSTEM SUITABLE OVER WIDE DEMAND VARIATION

BACKGROUND OF THE INVENTION

The present invention relates to a system for transmitting by a pipe line, substance usually in a gaseous state, for example, as methane, ethane, propane and the like.

In general, the production speed of gaseous substance is substantially constant due to the condition of the apparatus and production control therefor, but in many instances, the variation of demand for gas occurs frequently in wide range. In such case, when the supply for gas is over the demand for gas, the gas is stored, and reversely when the demand for gas exceeds the supply for gas, the gas in store is supplied supplementarily. As such means used most generally heretofore, there has been a system storing gas in a tank prepared therefor. With such system, however, an extremely gigantic tank has been required to meet wide variation of the demand for gas or the like, thereby bringing about drawbacks as higher cost required for the construction and maintenance of the tank.

To solve the problem above mentioned, a means wherein gas is liquefied and the liquefied gas thus obtained is transmitted by a pipe line, has been proposed or embodied, and with such means, the storage tank may be of small capacity, but heat retaining of the pipe line to keep it cool is necessary, causing much economical and technical problems as well as erosion problem.

Therefore, a gas transmission system by a pipe line, meeting wide and frequent variation of the demand for gas and dispensing with a gigantic storage tank and further making it feasible to transmit objective substance as gas at a room temperature, has been demanded eagerly.

SUMMARY OF THE INVENTION

The gas transmission system according to the present invention comprises means for liquefying the gas taken out from midway of a pipe line, a first tank for storing said liquefied gas, said first tank being heat-insulated against the inner space thereof, means for evaporating the liquefied gas taken out from said first tank, heat transmission fluid being cooled by the evaporation of said liquefied gas, a second tank for storing the cooled heat transmission fluid to utilize the fluid as the energy source for cooling gas in said means for liquefying gas, said second tank being heat-insulated against the inner space thereof, and means for changing over a first process for liquefying the gas taken out from said pipe line and storing the liquefied gas in said first tank and a second process for evaporating the liquefied gas taken out from said first tank and supplying the gas to said pipe line, thereby constituting to carry out selectively said first process when the supply for gas is over the demand for gas and said second process when the demand for gas exceeds the supply for gas.

Namely, when the supply for gas in the pipe line is over the demand for gas, excessive gas is stored in said first tank, and reversely when the demand for gas is over the supply for gas, the gas is supplied supplementarily to the pipe line from the first tank, thereby meeting the variation of the demand for gas.

Furthermore, the present invention is characterized by transmitting the substance by the pipe line as gaseous form and storing said substance in liquid form. Eventually, as the substance is transmitted as gas at room temperature, there is no technical or economical problem such as heat-insulation or pressure loss for the pipe line as required, for example, for transmitting liquefied gas as well as erosion problem, and also as the substance is stored after liquefaction, the capacity of the first tank may be lessened when compared to the capacity of a tank in which substance is stored in gas form.

Furthermore, the most remarkable feature of the present invention is characterized in that the energy for cooling caused by the evaporation of liquefied gas in said second process is receovered and preserved, and the energy preserved is utilized for liquefaction of gas in said first process. In this way, the amount of energy to be afforded from outside the system into the system has been reduced extremely in relation to amount of liquefied gas for reducing the required capacity of said first tank, and the running cost has become savable.

Moreover, the system according to the present invention is feasible to perform automatically the change over of said first and second processes and the control of the flow rate in the first and second processes respectively, with a simple controlling mechanism, and the labor saving in the operation management may be carried out easily.

An object of the present invention is to provide a gas transmission system useful when the variation of the demand for gas is brought about frequently in wide range. The primary object of the present invention is to provide a gas transmission system wherein, for supplying gas by a pipe line, the capacity of the tank for storing excessive gas is made as small as possible by liquefying the gas to be stored and also the amount of energy to be afforded from outside the system for liquefying the gas is lessened as much as possible.

Another object of the present invention is to provide a gas transmission system capable to supply automatically a proper amount of gas according to the aspect of gas demand.

Other object and advantages of the present invention will be apparent from the following description.

PREFERRED DESCRIPTION OF THE EMBODIMENT

Figure 1:
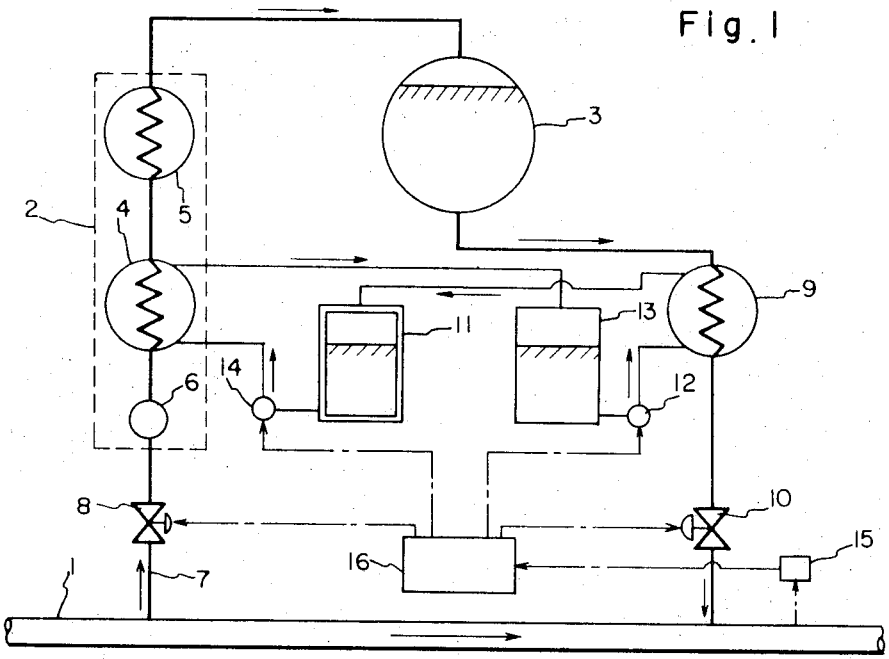
FIG. 1 is a diagrammatic view showing an embodiment of the gas transmission system according to the present invention.

Now, referring to FIG. 1, gas is transmitted under pressure in the direction of the arrow by a pipe line connecting the supply center and the consuming place. The substance to be transmitted is mainly of a single or near single ingredient of hydrocarbon gas of such as, for example, methane, ethane, propane and the like, and may be of various other gaseous bodies.

The gas taken out from midway of the pipe line 1 is liquefied by means 2 for liquefying by cooling and compressing, and the gas liquefied is stored in a first tank 3. Said liquefying means 2 comprises a heat-exchanger 4 such as plate fin tube etc., for precooling gas, a cooler 5 for cooling further the precooled gas with the energy afforded from outside the system, and a compressor 6 to raise the liquefaction temperature of the gas by compressing the gas. As for said cooler 5, a well known mechanism used, for example, in refrigerator or air cooling machine etc. may be utilized, and also the substance to be cooled with the cooler 5 may be the gas itself taken out from said pipe line 1 or the medium for indirect cooling such as the heat transmission fluid and the like supplied to said heat-exchanger 4. Said compressor 6 acts to raise the liquefaction temperature of gas, for example, the liquefaction temperature of methane is $-161°$ C but the liquefaction temperature may be raised more as the methane is compressed more, and thereby becoming dispensable with the cooler 5 of high quality or the cooler 5 itself. Said first tank 3 is of pressure resistance construction and also is heat insulated against the inner space thereof by covering the wall thereof with, for example, heat-insulating material, and thereby preventing the liquefied gas in storage from evaporation. The amount of gas taken out from said pipe line 1 may be regulated as desired with a distributing valve 8 provided on a branching pipe 7 thereby making it feasible to take out only excessive gas in the pipe line 1 therefrom into the first tank.

The liquefied gas taken out from the first tank 3 is supplied by a pipe 10 to the pipe line 1 after evaporated by evaporating means 9. The amount of gas supplied from the pipe 10 to the pipe line 1 may be regulated as desired with a control valve 10, and thereby the gas short in the pipe line 1 may be supplied from the first tank 3 to the pipe line 1. As for said evaporating means 9, a combination of, for example, an expansion valve and a heat-exchanger such as plate fin tube etc., or such heat-exchanger alone may be used.

A means is constituted with said distributing valve 8 and control valve 10 for changing over the first process liquefying the gas taken out from the pipe line 1 and storing it in the first tank 3 and the second process evaporating the liquefied gas taken out from the first tank 3 and supplying it to the pipe line 1, and said means performing selectively said first process when the supply for gas is over the demand for gas in the pipe line 1, and reversely said second process when the demand for gas is over the supply for gas in said pipe line 1 and thereby meeting the variation of the demand for gas in wide range and in frequency even when the supply for gas is maintained approximately constant.

As for the means for changing over said first and second processes, design may be modified variously and any construction is adoptable. The second tank 11 which is heat-insulated against the inner space thereof by covering the wall thereof with, for example, heat-insulating material is to store the heat transmission fluid, for example, water, methylalcohol, ethylalcohol, ethylene glycol, water solution of brine ($CaCl_2$), ethane, propane, butane, pentane and the like may be used. The heat transmission fluid is transferred from a third tank 13 to said liquefying means 9 through a pump 12, and is cooled in the liquefying means 9 accompanying the evaporation of the liquefied gas, and is stored in said second tank 11 in cooled condition, and is sent from the second tank 11 to the heat-exchanger 4 and then is returned to the third tank 13 after precooling the gas in the heat-exchanger. Thus, the heat transmission system may be operated reasonably by circulating the heat transmission fluid, but when, for example, river water or sea water can be obtained in large quantity and at low price as heat transmission fluid, the heat transmission fluid sent from the liquefying means 9 to the heat-exchanger 4 may be discharged without returning to the third tank 13.

Namely, the energy for cooling obtained from the evaporation latent heat of the liquefied gas in the second process being recovered with the medium of the heat transmission fluid, the recovered energy is preserved in the second tank 11, and the preserved energy is used as the energy for cooling gas in the first process. Accordingly, the amount of energy to be supplied from outside the system for liquefying gas, for example, the input to the cooler 5 and the compressor 6 may be lessened remarkably. The variation of the demand for gas is detected with a flow meter 15 provided in the pipe line 1, and the information according to the variation detected is transmitted to a controller 16 and then the controller 16 according to the information transmitted operates automatically the distributing valve 8, the pump 14, the control valve 10 and the pump 12 respectively. Namely, the difference between the supply for gas to the pipe line 1 memorized in the controller 16 and the demand for gas measured by the flow meter 15 is calculated by the controller 16, and when the supply for gas is over the demand for gas, simultaneously with the stoppage of operation of the pump 12, the gas supply from the first tank 3 to the pipe line 1 through the control valve 10 is ceased and simultaneously with the commencement of operation of the pump 14, the amount of gas to be taken out from the pipe line 1 through the distributing valve 8 may be determined. Reversely, when the demand for gas is over the supply for gas, simultaneously with the stoppage of operation of the pump 14, the gas supply from the pipe line 1 to the first tank 3 through the distributing valve 8 is ceased and simultaneously with the commencement of operation of the pump 12, the amount of gas to be supplied from the first tank 3 to the pipe line 1 through the control valve 10 may be determined. As above mentioned, the changeover of the first and second processes and the regulation of the flow rate are carried out automatically according to the actual aspect of demand and supply and the construction of such automatic control may be modified variously. Moreover a manual control may be adopted.

Figure 2:
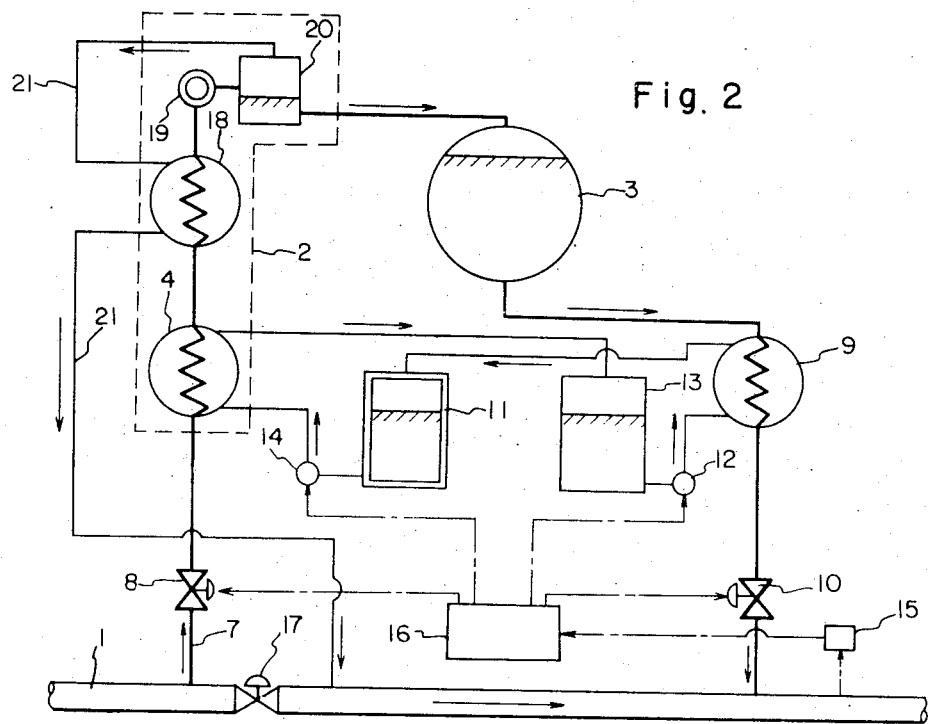
FIG. 2 is a diagrammatic view showing another embodiment of the gas transmission system according to the present invention.

Then, referring to FIG. 2, the mode of this embodiment is a system effective in such case as the gas transmitted from a supply center to storing place under high pressure (for example 50 kg/cm²) is further transmitted from the storing place to consuming place under low pressure (for example 1 kg/cm²). And, in the description of FIG. 2, for construction parts having the same functions with those shown in FIG. 1, the reference numbers conform to those in FIG. 1, and the detailed descriptions thereof are omitted.

A pressure reducing valve 17 is provided in the pipe line 1, for transmission of gas under high pressure at the up-stream side of the pressure reducing valve 17 and for transmission of gas under low pressure at the downstream side thereof. The branching pipe 7 is connected to the pipe line 1 at the up-stream side of the pressure reducing valve 17 and the gas supply from the third tank 3 to the pipe line 1 is carried out at the downstream side of the pressure reducing valve 17. The gas in a proper amount taken out from the pipe line 1 by the distributing valve 8 is precooled in the heat-exchanger 4, and is precooled further in another heat-exchanger 18 and then is expanded adiabatically in an adiabatic expansion means comprising an expansion valve 19 and an expansion tank 20, thereby being liquefied by cooling. And, the liquefied gas is sent from the expansion tank 20 to the first tank 3 and is stored therein. And, a part of the gas not liquefied by said adiabatic expansion is only cooled, but this cooled gas is returned to the pipe line 1 at the down-stream side of said pressure reducing valve 17 by a pipe 21. And, the cooled gas returning by the pipe 21 is utilized as the medium for cooling the gas to be sent to the expansion valve 19 in said another heat-exchanger 18, thereby utilizing heat energy effectively.

The liquefied gas stored in the first tank 3 is supplied to the pipe line 1 as gas after passing through the evaporating means 9 and the control valve 10 similarly to the case in FIG. 1. And, the cooling energy generated by the evaporation of the liquefied gas in the liquefying means 9 is recovered and preserved using the heat transmission fluid circulating through the second tank 11 and the third tank 13 as the medium similarly with the case in FIG. 1, and the cooling energy preserved is utilized as the energy for precooling the gas in the heat-exchanger 4. As above mentioned, when liquefaction of gas is carried out by expanding gas adiabatically, utilizing the pressure energy for the transmission of gas in the pipe line 1, means for an object of affording energy to liquefy gas from outside of the system, for example, as the cooler 5 in FIG. 1 becomes dispensable, thereby reducing widely the cost of equipment and the running cost.

The flow meter 15 and the controller 16 are to operate automatically the distributing valve 8, the pump 14, the control valve 10 and the pump 12 according to the demand for gas in the pipe line 1, the action and effect thereof are the same with the case in FIG. 1.

What I claim is:

1. A gas transmission system of the type which includes a pipe line and which must respond to frequent and wide range variation of demand for gas comprising, in combination:
   a. means for liquefying excessive gas taken out from midway of said pipe line;
   b. a first tank for storing the thus liquefied gas, said first tank being heat-insulated against the inner space thereof;
   c. means for evaporating liquefied gas taken out from said first tank;
   d. heat transmission fluid, said fluid being cooled by evaporation of liquefied gas taken from said first tank;
   e. a second tank for storing the thus cooled heat transmission fluid to utilize as an energy source for cooling gas in said means for liquefying excessive gas, said second tank being heat-insulated against the inner space thereof;
   f. means for detecting variation of demand for gas in said pipe line;
   g. means responsive to output from said means for detecting for changing over between a first mode of operation in which said means for liquefying excessive gas taken out from said pipe line is activated and resulting liquefied gas is stored in said first tank, and a second mode of operation in which said means for evaporating liquefied gas taken out from said first tank is activated and the resulting gas is supplied supplementarily to said pipe line; whereby the first mode selectively prevails whenever the supply of gas exceeds the demand for gas and the second mode selectively prevails whenever the demand for gas exceeds the supply of gas.

2. A gas transmission system according to claim 1, wherein said means for detecting variation comprises means for detecting difference between supply of gas and demand for gas in said pipe line, and further comprising means for controlling respectively (1) amount of gas to be taken out from said pipe line for sending into said first tank during operation in the first mode, and (2) amount of gas to be supplied from said first tank to said pipe line during operation in the second mode according to difference between the supply of gas and the demand for gas.

3. A gas transmission system according to claim 1, wherein said liquefying means comprises a heat-exchanger for performing heat exchange between said heat transmission fluid, cooled accompanying the evaporation of liquefied gas and the excessive gas taken out from said pipe line, and a compressor for compressing the excessive gas taken out from said pipe line.

4. A gas transmission system according to claim 1, further comprising a cooler for cooling excessive gas taken out from said pipe line.

5. A gas transmission system according to claim 1, wherein said means for liquefying consists of a heat-exchanger for precooling the excessive gas taken out from said pipe line, and means for expanding adiabatically the thus precooled gas.

6. A gas transmission system according to claim 1, wherein said means for evaporating consists of a heat-exchanger for performing heat-exchange between the liquefied gas and said heat transmission fluid.

7. A gas transmission system according to claim 1, further comprising a third tank for storing said heat transmission fluid after completing heat-exchange in said means for evaporating liquefied gas, and a flowing passage for re-using said heat transmission fluid stored in said third tank as the heat transmission fluid cooled accompanying evaporation of said liquefied gas.

* * * * *